United States Patent
Dandreaux et al.

(10) Patent No.: US 9,453,133 B2
(45) Date of Patent: Sep. 27, 2016

(54) ADDITIVES FOR IMPROVED HIDING AND PAINT COMPOSITIONS CONTAINING SAME

(71) Applicant: Columbia Insurance Company, Omaha, NE (US)

(72) Inventors: Gary Dandreaux, River Edge, NJ (US); Ashley Brewer, Middlesex, NJ (US); Caleb Jardel, Cresco, PA (US); Paulina Ogorzalek, Bloomsbury, NJ (US); Luz Clarena Shavel, East Stroudsburg, PA (US); Robert Sheerin, North Caldwell, NJ (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 14/531,354

(22) Filed: Nov. 3, 2014

(65) Prior Publication Data

US 2015/0057406 A1 Feb. 26, 2015

Related U.S. Application Data

(63) Continuation-in-part of application No. 13/717,781, filed on Dec. 18, 2012, now Pat. No. 8,895,658.

(51) Int. Cl.
| | | |
|---|---|---|
| *C09D 7/12* | (2006.01) |
| *C08F 265/02* | (2006.01) |
| *C08F 265/06* | (2006.01) |
| *C09D 151/00* | (2006.01) |
| *C08F 285/00* | (2006.01) |

(52) U.S. Cl.
CPC ............ *C09D 7/125* (2013.01); *C08F 265/02* (2013.01); *C08F 265/06* (2013.01); *C08F 285/00* (2013.01); *C09D 151/003* (2013.01)

(58) Field of Classification Search
CPC  C09D 7/125; C09D 151/003; C09D 133/06; C09D 151/00; C08F 265/02; C08F 265/06; C08F 285/00; C08F 220/18; C08F 212/08
USPC .......................... 524/504, 560, 523, 832, 23
See application file for complete search history.

(56) References Cited

U.S. PATENT DOCUMENTS

| | | | |
|---|---|---|---|
| 4,069,186 A * | 1/1978 | Ramig | C09D 5/02 428/522 |
| 5,385,960 A | 1/1995 | Emmons et al. | |
| 6,080,802 A | 6/2000 | Emmons et al. | |
| 6,559,204 B1 * | 5/2003 | Agarwal | C09D 5/088 106/14.14 |
| 2014/0094556 A1 | 4/2014 | Ahn et al. | |
| 2014/0171585 A1 | 6/2014 | Dandreaux et al. | |
| 2015/0005740 A1 | 1/2015 | Foster et al. | |

OTHER PUBLICATIONS

International Search Report and Written Opinion issued in connection with the corresponding International Application No. PCT/US2015/058595 on Jan. 27, 2016.

* cited by examiner

*Primary Examiner* — Michael M Bernshteyn
(74) *Attorney, Agent, or Firm* — The H.T. Than Law Group

(57) ABSTRACT

The architectural compositions, such as paints and stains, include an additive comprising a plurality of latex particles added to an existing mixture of opacifying pigments and a film-forming binder as an admixture. Each latex particle is made from a latex polymer copolymerized with a polymerizable surfactant. The latex polymer is a non-film forming polymer at ambient temperatures.

16 Claims, No Drawings

ADDITIVES FOR IMPROVED HIDING AND PAINT COMPOSITIONS CONTAINING SAME

CROSS-REFERENCE TO RELATED APPLICATIONS

This application is a continuation-in-part of U.S. patent application Ser. No. 13/717,781, filed Dec. 18, 2012, now U.S. Pat. No. 8,895,658. The entire disclosure of that application is incorporated herein by reference.

FIELD OF THE INVENTION

This invention generally relates to copolymerizing high glass transition temperature latex monomers in the presence of polymerizable surfactants to produce an additive that is mixed into an architectural composition containing opacifying pigments and binders.

BACKGROUND OF THE INVENTION

Architectural compositions such as paints and stains include a film-forming continuous phase component that may be aqueous or non-aqueous and that contains a polymer as a solute or as a colloidal dispersion. Opacifying pigments or pigments are particulate compounds dispersed in a paint binder to provide hiding power and color to paints and coatings. Pigments also improve the durability and weathering properties of paints, provide opacity and special effects, e.g., flip, sparkle, and modify flow and application properties. Dry pigments are dispersed in water and dispersants to form a grind, i.e., suspended in an aqueous solution. The grind is then added to aqueous a latex composition to form a paint or added in a colorant liquid composition. Heavy pigment particles are separated from one another and are distributed evenly throughout paint compositions as a colloidal suspension. Otherwise, a variety of defects can occur including color shift, flooding and floating, settling and loss of gloss. Pigments that have no charges on them and are not coated need surfactants or dispersants for better distribution.

After applying a paint or coating to a substrate and forming a film on the substrate, pigments in the paint or coating absorb and scatter light to prevent light from passing through the film to layers below on the substrate and back to the eye of an observer. The hiding power or opacifying power of paint is expressed by the number of square meters covered by 1 liter of paint to produce complete hiding. In addition, the hiding power of a pigment is expressed as the number of square meters covered by a kilogram of pigment dispersed in a paint such that when applied over previously applied paint layers, the pigment hides the color of any previous layer.

Typical opacifying pigments include titanium dioxide ($TiO_2$), which has hiding power due to its high refractive indices and optimum particle size for maximum hiding power. For example, rutile titanium dioxide white has a particle diameter of 200 nm-300 nm. The distribution or arrangement of titanium dioxide particles in paint, however, affects the resulting hiding power. For example, titanium dioxide can be transparent when present in the form of large clusters of particles, and its hiding power is reduced significantly when agglomerated due to reduced light scattering efficiency. Conversely, good particle dispersion increases the hiding efficiency of titanium dioxide particles in paint. Additives such as dispersing agents and surfactants are used in paints to prevent titanium dioxide particles from agglomerating and to maximize the hiding power of the titanium dioxide particles in those paints.

Another consideration in the use of titanium dioxide as an opacifying pigment in paints is cost. Since titanium dioxide is an expensive component, cost savings are realized through the use of decreased amounts of titanium dioxide. Attempts to reduce the amount of titanium dioxide as a hiding or opacifying pigment in paint compositions are discussed in U.S. Pat. No. 5,385,960 to Emmons et al., U.S. Pat. No. 6,080,802 to Emmons et al., U.S. Patent Application Publication no. 2012/0058277 to Bohling et al., and U.S. Patent Application Publication no. 2012/0058278 to Bohling et al., and U.S. Pat. No. 7,960,026 to Koller et al.

These previous attempts only used monomers having the desired functionality for titanium dioxide particle attachment. Other additives generally found in paints and coatings include surfactants. Surfactants include both hydrophobic and hydrophilic ends and are typically added, for example, during the grind or letdown stages of paint formation in order to achieve the desired, dispersion of particles in the paint. International Patent Application no. PCT/US2013/039784 to Palmer et al., discloses the creation of latex particles that are manufactured in the presence of a reactive surfactant. The titanium dioxide particles are then added to this latex particle dispersion. These latex particles, however, have a low glass transition temperature and function as the binder or film-forming polymer in the resultant paint films. Particles with low glass transition temperatures do not provide as reliable a spacing among the titanium dioxide particles. Therefore, coating compositions are desired that provide for more reliable spacing among opacifying particles in order to reduce the amount of opacifying pigment required in the coating composition.

SUMMARY OF THE INVENTION

The present invention is directed to an architectural composition comprising an additive comprising latex particle, wherein the latex particles comprise a polymer copolymerized with a polymerizable surfactant, opacifying pigments and a film-forming polymer binder. Said polymer is non-film forming at room or ambient temperature and has a glass transition temperature greater than about 30° C., preferably greater than about 50° C. and more preferably greater than about 100° C., and the latex particles form an admixture with the film-forming polymer binder.

The polymerizable surfactant comprises a mono or multi allyl end to bond to the latex polymer and a phosphate or sulfate end to adsorb to the opacifying pigments. The latex particles comprise a particle size of from about 100 nm to about 200 nm, preferably from about 140 nm to about 150 nm.

A weight ratio of additive to the opacifying pigments in the architectural composition is from about 1:5 to about 1:15, more preferably from about 1:7.5 to about 1:12.5. The latex polymer copolymerized with the polymerizable surfactant comprises from about 5% to about 25%, preferably from about 7% to about 15% of a total amount of polymer in the architectural composition. The additive comprises from about 0.5% to about 7.5%, preferably from about 1.0% to about 3.5% by weight of the architectural composition. As used herein, the weight ratios of additive to opacifying pigments and the percentage of the latex polymer in the additive to total polymer in the architectural composition are based on solid contents.

The present invention is also directed to a method for improving a hiding property of an inventive architectural aqueous composition having an additive and a reduced opacifying pigment level comprising the steps of:

preparing a standard architectural aqueous composition having a full load of opacifying pigment level;

(ii) preparing a second architectural aqueous composition having said reduced opacifying pigment level, which is lower than said full load of opacifying pigment level by a predetermined amount;

(iii) determining a first tint strength of the second architectural composition relative to the standard architectural composition;

(iv) preparing said inventive architectural aqueous composition by adding to the second architectural aqueous composition said additive, wherein said additive improves the spacing of the opacifying pigments in a dried film made from an evaporation of the inventive architectural aqueous composition;

(v) determining a second tint strength of the inventive architectural aqueous composition relative to the standard architectural composition;

(vi) ensuring that the second tint strength is higher than the first tint strength. The additive can be latex particles copolymerized from a latex polymer and a polymerized surfactant discussed below, and can be acid functional polymers and polymeric carriers grafted to each other, summarized below and discussed in the parent patent application.

The present invention is further directed to a method for making an additive for an architectural composition comprising the steps of:

creating latex particles by polymerizing latex monomers in the presence of a polymerizable surfactant, wherein the latex particles are non-film forming at room temperature and have a glass transition temperature greater than about 30° C.; wherein the polymerizable surfactant comprises a mono or multi allyl end and a phosphate or sulfate end;

polymerizing the latex monomer over a prescribed period of time; and polymerizing the latex monomer in the presence of the polymerizable surfactant over only a final about ½ to about ¼ of the prescribed period of time.

The present invention is also directed to an additive for the architectural composition, the additive comprising a plurality of latex particles, each latex particle comprising a latex polymer copolymerized with a polymerizable surfactant, the latex polymer is non-film forming at room temperature polymer and has a glass transition temperature greater than about 30° C., wherein the additive is capable of forming an admixture with a binder in the architectural composition and of attaching to opacifying pigments in the architectural composition.

DETAILED DESCRIPTION OF THE INVENTION

Typically, a latex paint is prepared in two steps. In the grind stage, pigments, dispersants and water, along with other additives are added to a vessel and mixed at high speed. During this step, each agglomerate of pigment is broken down into its nascent particle size. Once pigment agglomerates are broken down, they need to be stabilized against reagglomeration. That stability is provided by dispersants, such as the commercially available Tamol™ dispersants which are low molecular weight, acid functional polymers and/or surfactants. These materials are available both base neutralized and un-neutralized. These polyacid dispersants are believed to adsorb onto the pigment particle surface, providing pigment particles which are electrostatically stabilized against agglomeration. In the letdown stage, the grind is mixed with an aqueous latex resin and other additives, such as surfactants, thickeners, defoamers, biocides, etc. to make architectural compositions such as paints.

The opacifying power of a paint film is a function of the amount of opacifying pigment particles and the spacing of those opacifying pigment particles in the resulting paint film. Suitable opacifying pigments are inorganic pigments and include, but are not limited to, titanium dioxide (ilmenite, rutile and anatase), aluminum silicate, calcium carbontate, magnesium silicate, barium sulfate, zinc oxide, zinc sulfite and combinations thereof. Preferably the opacifying pigment is titanium dioxide. Suitable particle sizes for the opacifying pigment particles are from about 10 nm to about 50,000 nm. To maximize scattering from titanium dioxide particles, they are preferably spaced at least or up to one diameter in distance from each other. As the typical diameter of a particle of titanium dioxide is about 250 nm, that spacing cannot be provided by the low molecular weight polyacid dispersant known in the art. In addition, it may be desirable to reliably maintain a spacing among the opacifying pigment particles that are less than about 250 nm. In order to achieve this spacing, particles are desired having a size in the range of from about 50 nm up to about 250 nm. These particles adsorb to the opacifying pigment particles and do not deform under ambient conditions. Deformation is prevented and the desired spacing is maintained by using particles containing polymers having a sufficiently high glass transition temperature.

In the parent application Ser. No. 13/717,781, spacing between titanium dioxide pigment particles is provided by attaching, preferably by grafting, acid functional polymers to the surfaces of carrier polymers, thereby allowing the resulting polymeric particles to adsorb to the titanium oxide pigment surfaces. In the parent invention, carrier monomers are polymerized in the presence of a polymeric pigment dispersant to yield polymeric particles with the polymeric pigment dispersant grafted at the surfaces of the resulting polymeric particles.

An embodiment in parent application discloses a grafted pigment dispersing additive that comprises a polymeric pigment dispersant and a polymeric carrier grafted to each other. The polymeric pigment dispersant has a weight average molecular weight of about 1,000 Daltons to about 20,000 Daltons, and an acid number from about 150 to about 250. The polymeric pigment dispersant is also soluble in an alkali solution. The minimum film forming temperature (MFFT) of the polymeric carrier is greater than about 10° C. and less than about 130° C. preferably less than about 100° C., and greater than about 15° C. and preferably greater than about 20° C. The grafted pigment dispersing polymeric additive is capable of adsorbing to an opacifying pigment, such as titanium dioxide. The additive comprises particles having an average particle size in the range of about 75 nm to about 200 nm in diameter.

Another embodiment of the parent application Ser. No. 13/717,781 is directed to a grafted pigment dispersing polymeric additive comprising a polymeric pigment dispersant and a polymeric carrier grafted to each other. The polymeric pigment dispersant has a weight molecular weight of about 5,000 Daltons to about 20,000 Daltons, and an acid number from about 150 to about 250. The polymeric pigment dispersant is also soluble in an alkali solution. The polymeric carrier comprises at least a styrene or an acrylic group. The grafted pigment dispersing polymeric additive is capable of adsorbing to an opacifying pigment, such as titanium dioxide. The additive comprises particles having an average particle size in the range of about 75 nm to about 200 nm in diameter. The acrylic group may comprise a methyl methacrylate or a butyl acrylate.

The additive disclosed in the parent application may have an average particle size in the range of about 75 nm to about 137 nm or about 177 nm. The polymeric carrier of the additive disclosed in the parent application may be single phase polymers, multi-phase polymers or core-shell polymers. The polymeric pigment dispersant comprises at least about 1% and preferably less than 50% of the total weight of the grafted pigment dispersing polymeric additive. The weight average molecular weight of the polymeric dispersant can also be in the range of about 8,000 to about 17,000 Daltons.

In the present invention, spacing between opacifying pigments in architectural coatings, such as paints and stains, is provided by another additive formed by polymerizing non-film forming monomers with a polymerizable surfactant. The surfactant has certain functional groups, such as allyl, diallyl or multi-allyl, and phosphate or sulfate. The non-film forming monomers preferably have a high glass transition temperature (Tg) to provide the additive with sufficient hardness to maintain the spacing between the opacifying pigments. The Tg should be sufficiently above ambient temperature, either indoor or outdoor depending on the application, as discussed below to maintain the spacing.

In one embodiment of the present invention, spacing between titanium dioxide pigment particles is provided by admixing an additive to an existing mixture of the architectural composition binder and an opacifying pigment, allowing the polymeric particles in the additive to adsorb to the opacifying pigment particle surfaces. The polymeric particles of the additive have a size that establishes the desired spacing among opacifying pigment particles and are formed from a polymer that has a high glass transition temperature. This high glass transition temperature is at least higher than the glass transition temperature of the binder polymers used in the architectural composition binder. The polymeric particles are created by copolymerizing monomers with a polymerizable surfactant to yield polymeric particles having the desired surface functionalities for attachment to the surfaces of the opacifying pigment particles.

The present invention is directed to the additive, the architectural composition, e.g., paint, that contains the additive, a method for improving hiding and a method for making the architectural composition. In general, the additive is capable of forming an admixture with a binder in the architectural composition and of attaching to opacifying pigments in the architectural composition. In one embodiment, the additive includes a plurality of latex particles. Each latex particle is formed from at least one non-film forming latex polymer that is copolymerized with a polymerizable surfactant. As used herein, the non-film forming polymer is not a binder is non-film forming at room temperature or ambient temperature, e.g., from about 20° C. to about 26° C. indoor or up to about 45° C. outdoor. Film-forming polymer or latex is a binder that forms a film at said room or ambient temperature. Suitable latex polymers are non-film forming polymers having a glass transition temperature greater than about 30° C., preferably greater than about 40° C. In one embodiment, the non-film forming polymers have a glass transition temperature greater than about 50° C., preferably greater than about 60° C., 70° C., 80° C. or 90° C. and more preferably greater than about 100° C.

Suitable non-film forming latex polymers preferably include acrylics and vinyl acrylics. Preferably, the latex polymer is a methacrylate polymer. Other suitable non-film forming latex polymers include, but are not limited to, polystyrene, poly(vinyl acetate), polychlorotrifluoroethylene, polyethylene terephthalate, poly(vinyl chloride) and poly(vinyl alcohol). In one embodiment, any acrylic monomers can be used in the present invention to produce a suitable non-film forming latex polymer. Suitable acrylic monomers include, but are not limited to methyl acrylate, ethyl acrylate, methyl methacrylate, and ethyl methacrylate, butyl acrylate and butyl methacrylate, iso-octyl methacrylate and acrylate, lauryl acrylate and lauryl methacrylate, 2-ethyl hexyl acrylate, stearyl acrylate and methacrylate, isobornyl acrylate and methacrylate, methoxy ethyl acrylate and methacrylate, 2-ethyoxy ethyl acrylate and methacrylate, 2-hydroxyethyl acrylate, 2-hydroxybutyl, dimethylamino ethyl acrylate and methacrylate, acrylates, alkyl(meth) acrylic acids such as methyl acrylic acids, wet adhesion monomers, such as N-(2-methacryloyloxyethyl)ethylene urea, and multifunctional monomers such as divinyl benzene, diacrylates, for crosslinking functions etc., acrylic acids, ionic acrylate salts, alkacrylic acids, ionic alkacrylate salts, haloacrylic acids, ionic haloacrylate salts, acrylamides, alkacrylamides, monoalkyl acrylamides, monoalkyl alkacrylamides, alkyl acrylates, alkyl alkacrylates, acrylonitrile, alkacrylonitriles, dialkyl acrylamides, dialkyl alkacrylamides, hydroxyalkyl acrylates, hydroxyalkyl alkacrylates, only partially esterified acrylate esters of alkylene glycols, only partially esterified acrylate esters of non-polymeric polyhydroxy compounds like glycerol, only partially esterified acrylate esters of polymeric polyhydroxy compounds, and combinations thereof. The alkyl methacrylate monomer is preferably methyl methacrylate.

Preferred monomers containing aromatic groups are styrene and α-methylstyrene. Other suitable monomers containing aromatic groups include, but are not limited to, 2,4-diphenyl-4-methyl-1-pentene, 2,4-dimethylstyrene, 2,4,6-trimethylstyrene, 2,3,4,5,6-pentafluorostyrene, (vinylbenzyl)trimethylammonium chloride, 2,6-dichlorostyrene, 2-fluorostyrene, 2-isopropenylaniline, 3(trifluoromethypstyrene, 3-fluorostyrene, α-methylstyrene, 3-vinylbenzoic acid, 4-vinylbenzyl chloride, α-bromostyrene, 9-vinylanthracene, and combinations thereof.

Preferred monomers containing primary amide groups are methacrylamide, and acrylamide. Other suitable monomers containing amide groups include, but are not limited to, N-vinylformamide, or any vinyl amide, N,N-dimethylacrylamide, N-(1,1-dimethyl-3-oxobutyl)(meth)acrylamide, N-(hydroxymethyl)(meth)acrylamide, N-(3-methoxypropyl)acrylamide, N-(butoxymethyl)acrylamide, N-(isobutoxymethyl)acryl(methacryl)amide, N-[tris(hydroxymethyl)methyl]acryl(methacryl)amide, 7-[4-(trifluoromethyl)coumarin](meth)acrylamide, 3-(3-fluorophenyl)-2-propenamide, 3-(4-methylphenyl)acrylamide, N-(tert-butyl)(meth)acrylamide, and combinations thereof. These monomers can be polymerized with acrylic monomers, listed above.

Suitable styrene monomers include, but are not limited to, styrene, methylstyrene, chlorostyrene, methoxystyrene and the like. In this embodiment, styrene monomers are preferably co-polymerized with methacrylamide and acrylamide monomers.

Suitable vinyl monomers include vinyl esters, such as, for example, vinyl propionate, vinyl laurate, vinyl pivalate, vinyl nonanoate, vinyl decanoate, vinyl neodecanoate, vinyl butyrates, vinyl caproate, vinyl benzoates, vinyl isopropyl acetates and similar vinyl esters; nitrile monomers, such acrylonitrile, methacrylonitrile and the like; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

The inventive additive particles have an average particle size of from about 50 nm to about 250 nm, or from about 75 nm to about 225 nm, preferably from about 100 nm to about 200 nm and more preferably from about 140 nm to about 150 nm. In one embodiment, the polymer latex polymers have a particle size of about 140-150 nm. The low end of the average particle sizes can be 50 nm, 75 nm, 100 nm, or 125 nm, and the high end of the average particle sizes can be 150 nm, 175 nm, 200 nm, 225 nm or 250 nm. The range of acceptable average particle sizes can be from any low end number to any high end number. The average particle sizes are average diameters based on a volume average.

The high glass transition temperature latex is copolymerized with phosphate containing ethylenically unsaturated reactive surfactants. These reactive surfactants include functionalities or reactivities on their hydrophobic ends that are covalently bound to the polymer latex During polymerization, such as emulsion polymerization, these reactive functionalities irreversibly bind to the latex polymer. Suitable reactive polymerizable surfactants include, but are not limited to, mono and multi-allyl anionic surfactants including sulfates and phosphates. In one embodiment the polymerizable surfactant is a diallyl phosphate surfactant. This polymerizable surfactant is covalently bound to the latex polymer through its diallyl functionality and can bind by adsorption to the inorganic opacifying pigments through the phosphate functionality.

The additive is formed separately from the other components of the architectural composition and is used as an additive to reduce and to optimize the amount of opacifying pigment required in the architectural composition. The additive can be used at a desired weight ratio to the opacifying pigment, as a percentage of the entire resin package within the architectural composition or as a weight percentage within the entire architectural composition.

In one embodiment, the weight ratio of the additive solids to opacifying pigment solids is from about 1:5 to about 1:15, preferably from about 1:7.5 to about 1:12.5 and more preferably from about 1:9.5 to about 1:11.5. In one embodiment, the weight ratio of additive solids to opacifying pigment solids in the architectural composition is about 1:10 or from about 1:9.5 to about 1:11. These weight ratios can be determined by the amount of opacifying pigment in the architectural composition and whether the additive is being used to reduce the amount of opacifying pigment, e.g., decreasing the amount of opacifying pigment by about 15% or is being used as an additive to improve hiding of an existing amount opacifying pigment in architectural compositions having a relatively low level of opacifying pigment. In general, the least amount of additive is used that can provide the desired increase in hiding of the architectural composition or the desired decrease in opacifying pigment.

In another embodiment, the non film-forming additive solids is present up to about 30% of the total solid resin package, which includes the film-forming binder resin of the architectural composition. For example, the resin package can include up from about 5% to about 25% of the non film-forming additive and from 75% to almost 95% of the film-forming binder resin. Alternatively, the resin package includes from about 7% to about 15% of the non film-forming additive and from about 85% to about 93% of the film-forming binder resin. The non film-forming additive can make up from about 9% to about 12.5% of the total resin package. Again, the lowest amount of additive is used to achieve the desired improved properties in the architectural composition. In general, the amount of film-forming binder resin in the architectural composition is maintained at a level sufficient to provide the desired binding for the architectural composition. Increasing the amount of additive above the percentage corresponding to this amount of resin is preferably achieved through a corresponding replacement of opacifying pigment.

In another embodiment, the weight percentage of the additive in the total weight of the aqueous or architectural composition is about ½% to 7.5%, more preferably about 1% to about 3.5% or about 1.5% to about 2.5%, or about 1.75% to about 2.25%.

Example 1

In one embodiment, the additive is prepared by adding 666 g deionized water, 1.0 g of an emulsifier, for example a sodium lauryl sulfate emulsifier such as Rhodapon® UB commercially available from Solvay Novecare, 2.0 g of sodium bicarbonate and 3.8 g polypropylene glycol PPG-725 to a five liter round bottom flask. This mixture is heated with stirring to about 75-80° C. under nitrogen.

A preparation or pre-emulsion of the acrylic monomers is prepared by adding 1077.7 g methyl methacrylate, which is the major component and yields a polymer having a Tg of about 105° C., and 6.98 g methacrylic acid to 301.6 g deionized water along with 40.8 g of the sodium lauryl sulfate emulsifer Rhodapon® UB and 35.9 g of a second emulsifier, for example a polyoxyethylene tridecyl ether phosphate emulsifier such as Rhodafac® RS-610 A25, which is commercially available from Rhodia. A first amount, about 77 g, of the pre-emulsion is added to the round bottom flask at a temperature of about 78° C. After 15 minutes, an emulsion polymerization initiator such as an oxidizer solution is added to the round bottom flask. In one embodiment, a solution of 1.5 g sodium persulfate in 38.4 g deionized water was added to the round bottom flask at a temperature of about 80° C. Another 15 minutes after the addition of the polymerization initiator, the remainder of the pre-emulsion is fed in over a period of 2.75 hours, while maintaining the reaction temperature at about 80° C.

In order to introduce the reactive surfactant into the polymerization process for copolymerization, a solution of 30 g of about a 50% solution of a diallyl phosphate surfactant in 50 g of deionized water is created. Suitable diallyl phosphate surfactant solutions include ERS-1684, which is commercially available from Ethox Chemicals. In general, the latex monomer is polymerized over a prescribed period of time, and the latex monomer is polymerized in the presence of the polymerizable surfactant over only from a final ½ to a final ¼, preferably a final ⅓, of the prescribed period of time. For example, two hours after the start of the pre-emulsion feed of the remainder of the pre-emulsion, i.e., two hours into a two hour and forty five minute monomer feed, the reactive surfactant solution is added with mixing to the remainder of the pre-emulsion. In addition, at the start of the pre-emulsion monomer feed, a solution of about 2.0 g sodium persulfate, i.e., oxidizer, in 48 g water is fed in over a three hour period. It is noted that the persulfate feed continues for fifteen minutes past the end of the pre-emulsion feed. Thirty minutes after the end of the persulfate feed, the reactor is cooled to 60-65° C. After cooling, about 5.19 g of a reducing agent for emulsion polymerization such as Bruggolite® FF6 M, which is commercially available from Braggemann-Group, in 26.5 g of DI water is added, along with 2.6 g t-butyl hydroperoxide in 13 g water. Another 2.6 g t-butyl hydroperoxide in 13 g water is added 15 minutes later, and the resulting latex polymer is cooled to room temperature with 7.7 g of a preservative such as Polycide 428, added 15 minutes later. The latex polymer is recovered by filtration.

The resulting latex polymer has the following properties: pH 9.04, viscosity 74 cP, particle size 148 nm, and solids 46.9%. This yields the additive containing the plurality of latex particles where each latex particle is a latex polymer copolymerized with a polymerizable surfactant and where the latex polymer is a non-film forming polymer having a first glass transition temperature greater than about 30° C., preferably greater than about 50° C. and more preferably greater than about 100° C.

In order to create the architectural composition using the additive, a grind is created containing a plurality of opacifying pigment particles such as titanium dioxide particles. In one embodiment, titanium dioxide, along with other pigments, is dispersed in a grinding step in the presence of a dispersant. The dispersant is typically a low molecular weight acidic functional polymer which interacts with the surface of a titanium dioxide particle, but is relatively ineffective in preventing titanium dioxide particles from interacting. The grind is mixed or letdown in a second step in the presence of a binder latex. The additive is added to this mixture of the grind and binder such that the plurality of latex particles is an admixture in the grind and binder mixture. In one embodiment, the binder is a latex polymer having a second glass transition temperature, that is less than about 20° C., preferably less than about 10° C., and more preferably less than about 0° C. In general, suitable binders include, but are not limited to, a polymer, a thermoplastic binder, a natural resin, a cellulose derivative, acrylic, vinyl, chlorinated polymers, polyester, a film-forming latex polymer and combinations thereof.

Various examples of the architectural compositions both with and without the additive of the present invention were created in order to demonstrate the improved hiding properties with reduced amounts of opacifying pigment resulting from the use of the additive in an admixture.

Example 2

A standard paint is created using 269 lbs. of titanium dioxide per 100 gallons of paint. Initially, a grind was created using the following formulation (all values in pounds per 100 gallons, which are the conventional units in the paint industry):

| Grind: | |
|---|---|
| Water | 182.57 |
| Biocide Package 1 | 3 |
| Cellulosic Thickener 1 | 0.50 |
| Dispersant 1 (25% solution) | 10.0 |
| Dispersant 2 (42% solution) | 1.8 |
| TiO$_2$ (Tronox CR-826) | 269 |

| Grind: | |
|---|---|
| Extender Pigment Package 1 | 147 |
| Defoamer 1 | 0.9 |

The resulting grind was then letdown with the following film-forming binder and other additives.

| Letdown: | |
|---|---|
| Coalescent 1 | 17 |
| Nonionic Surfactant 1 | 4.4 |
| Anionic Surfactant 1 (60%) | 1.1 |
| Water | 2 |
| Acrylic Latex 1 (50%) | 408 |
| Nonionic Associative Thickener 1 (20%) | 13.5 |
| Nonionic Associative Thickener 2 (20%) | 3 |
| Water | 10.3 |
| Cellulosic Thickener 1 | 1.1 |
| Ammonia (28%) | 0.9 |
| Biocide 2 | 0.5 |
| Defoamer 1 | 8 |
| Water | 63.6 |

The resulting paint had a viscosity of 98 KU and 1.12 ICI.

Example 3

A paint containing 85% of the titanium dioxide of the paint of Example 2 was prepared. In this formulation, 228 lbs. of TiO$_2$ per 100 gallons of paint was used, and the paint was prepared in a fashion similar to that in Example 2. The volume decrease resulting from the decreased amount of TiO$_2$ is made up with water. In addition, in the last step of the letdown 72.7 lbs. of water are used instead of 63.6. The resulting paint had a viscosity of 90 KU and 0.904 ICI.

Example 4

A paint containing 85% of the titanium dioxide of the paint of Example 2 and 45 pounds of the inventive additive from Example 1 described above was prepared. This formulation used 228 lbs. of TiO$_2$ per 100 gallons of paint and included 45 pounds of the latex particle additive. The paint was prepared in accordance with the preparation outlined in Example 2, with the additive added as an admixture during letdown and after the Acrylic Latex 1, i.e., film-forming binder, was added. The overall volume increase caused by reducing the titanium dioxide and adding the latex particle additive was overcome by reducing the water in the letdown from 63.6 lbs. to 31.2 lb. In addition, 10.8 pounds of Nonionic Associative Thickener 1 were used instead of 13.5 lbs., and 0.8 lbs. of Cellulosic Thickener 1 were used instead of 1.1 lbs. The resulting paint had a viscosity of 98 KU and 0.846 ICI. The ratio of additive solids (45 lbs. @ 46.9% solid) to opacifying pigment (228 lbs.) in this Example is about 1:10.9. The percentage of additive (45 lbs. @ 46.9% solids) to total resin package (408 lbs. @ 50% solids +45 lbs. @ 46.9% solids) is about 9.93%. The percentage of additive solids (45 lbs. @46.9%) to the total weight of paint (e.g., 1148 lbs. from Example 2) is about 1.83%.

Example 5

The paints from Examples 2, 3 and 4 were evaluated for hiding. Contrast ratios of the paints were determined. For contrast ratios, a 2-mil drawdown of the wet paint is done on a Penopac Chart 5314 (Byk-Gardner). The chart has three regions: a coated black region, a coated white region and an uncoated region. The drawdown is allowed to dry overnight. The following day, the Y reflectance of the paint over the coated black part of the chart and the Y reflectance of the paint over the coated white part of the chart are determined on a Gretag Macbeth Color Eye 2145. Whiter coatings will give rise to higher Y values. The contrast ratio is the ratio of the Y value of the paint over the black region divided by the Y value of the paint over the white region. Each of the experimental paints in Examples 2-4 is evaluated for contrast ratio on the same card versus the standard paint. A "delta contrast ratio" is reported for the experimental paints, which is the contrast ratio of the experimental paint minus that of the standard paint. A positive delta contrast ratio means the experimental paint had a higher contrast ratio than that of the standard paint, and a negative number means the contrast ratio of the standard paint is higher than that of the experimental paint. Also reported is a "delta reflectance", which is the Y reflectance over black of the experimental minus that of the standard.

Tint strength is also reported. As used herein, tint strength is defined as a measure of how well titanium dioxide can add whiteness to a tinted paint. In a preferred tint strength test, 5 grams of a standard black colorant are added to 14 ounces of paint and mixed. A 3 mil drawdown is made and allowed to dry overnight. Both an experimental and a standard control paint are tested. The standard control paint is the paint containing the full loading of titanium dioxide. The tint strength of the experimental relative to the standard is determined by measuring the reflectances of the control and experimental drawdowns with a Gretag Macbeth Color Eye 2145, and then determining base tint strength using the software of the Color Eye 2145. A higher tint strength signifies a whiter base paint. This improvement is most likely due to better dispersion of titanium dioxide in the dry paint film.

The results are summarized below in Table 1:

TABLE 1

Paint Sample Test Results

| Example | Example 2 Standard Paint 269 lbs. TiO$_2$ | Example 3 Standard Paint at 85% TiO$_2$ Loading | Example 4 Standard Paint at 85% TiO$_2$ loading and 45 lbs. of Additive |
|---|---|---|---|
| TiO$_2$ Loading | 100% | 85% | 85% |
| Dry Contrast Ratio | 0.972-0.975 | 0.970 | 0.973 |
| Delta Contrast Ratio | | −0.004 | +0.001 |
| Dry Reflectance | 88.3-88.77 | 87.86 | 88.29 |
| Delta Reflectance | | −1.14 | −0.01 |
| Tint Strength | n/a | −11.60% | −3.22% |

When TiO$_2$ is removed from the formulation as in Example 3, the contrast ratio and reflectance both drop significantly versus the standard of Example 2. The tint strength also drops to −11.6%. When the inventive additive is added to a formulation at 85% TiO$_2$ loading as in Example 4, the contrast ratio and reflectance are both about the same as those of Example 2, and the tint strength is reduced, but not as much as in the case when the inventive additive is not present. In certain situations, the tint strength of the paint with reduced TiO$_2$ loading and with inventive additive may have tint strength that is higher than the tint strength of standard paint with a full TiO$_2$ load.

Alternatively, the dry contrast ratio can be used instead of tint strength to determine whether the additive improves the hiding of a paint with reduced TiO2 loading and with inventive additive. The difference in contrast ratios between the standard paint and the paint with reduced TiO2 can be compared to the difference in contrast ratio between the standard paint and the paint with reduced TiO2 and the inventive additive.

Example 6

A second standard paint was prepared using 248 lbs. TiO$_2$ per 100 gallons of paint. The grind was prepared according to the following formula (all values are in pounds per 100 gallons):

| Grind: | |
|---|---|
| Water | 179.56 |
| Cellulosic Thickener 1 | 1.0 |
| Biocide Package 3 | 3.25 |
| Dispersant 1 | 4.0 |
| Dispersant 3 | 6.0 |
| TiO$_2$ (Tronox CR-826) | 143 |
| TiO$_2$ (Tronox CR-813) | 105.5 |
| Extender Pigment Package 2 | 85 |
| Defoamer 2 | 0.949 |

The grind was then letdown with a film-forming latex according to the following formula:

| Letdown: | |
|---|---|
| Nonionic Surfactant 1 | 8.312 |
| Anionic Surfactant 1 (60%) | 1.05 |
| Coalescent 1 | 13.5 |
| Water | 156.9 |
| Vinyl Acrylic Latex (51%): | 372 |
| Ammonia (28%)1 | 5 |
| Cellulosic Thickener 1 | 6 |
| Defoamer 2 | 7.2 |
| Propylene Glycol | 3.3 |

The resulting second standard paint had a viscosity of 94 KU.

Example 7

A preparation of a paint containing 85% of the titanium dioxide of the second standard paint Example 6 was made using 211 lbs. TiO$_2$ (121.6 lbs. CR-826, 89.7 lbs. CR-813) per 100 gallons of paint. It was prepared in a fashion similar to that in Example 6. The volume decrease caused by removing the TiO$_2$ was made up with water. In the letdown, 168 lbs. of water are used instead of 156.9. Another difference was that 6.3 lbs. of Cellulosic Thickener 1 were used instead of 6 lbs. The resulting paint had a viscosity of 89 KU.

Example 8

A preparation of a paint containing 85% of the titanium dioxide of the second standard paint of Example 6 and 45 pounds of the inventive additive of Example 1 was made. This formulation used 211 lbs. of TiO$_2$ (121.6 lbs. CR-826, 89.7 lbs. CR-813) per 100 gallons of paint and included 45 pounds of inventive additive. It was prepared in a fashion similar to the preparation outlined in Example 6 with the latex particle additive admixed after the Vinyl Acrylic Latex.

The overall volume increase caused by reducing the titanium dioxide and adding the inventive additive was overcome by reducing the water in the letdown from 156.9 lbs. to 126.9 lb. Another difference was that 6.2 lbs. of Cellulosic Thickener 1 were used instead of 6 lbs. The resulting paint had a viscosity of 90 KU. The ratio of additive solids (45 lbs. @46.9% solids) to opacifying pigment (211 lbs.) in this Example is about 1:10.0. The percentage of additive solids (45 lbs. @46.9%) to total resin package (372 lbs. @ 51%+45 lbs. @46.9%) is about 9.97%. The percentage of additive solids (45 lbs. @46.9%) added to the total weight of paint (e.g., 1106 lbs. from Example 6) is about 1.91%.

Example 9

An evaluation of paints from Examples 6, 7 and 8 was conducted for hiding. Contrast ratios and tint strengths of the paints were determined as described in Example 5.

The results are summarized in the following Table 2:

TABLE 2

Paint Sample Test Results Second Standard Paint

| Example | Example 6 Second Standard Paint 248 lbs. TiO$_2$ | Example 7 Second Standard Paint at 85% TiO$_2$ Loading | Example 8 Second Standard Paint at 85% TiO$_2$ Loading and 45 lbs. Additive |
|---|---|---|---|
| TiO$_2$ Loading | 100% | 85% | 85% |
| Dry Contrast Ratio | 0.957-0.967 | 0.959 | 0.962 |
| Delta Contrast Ratio |  | −0.008 | +0.005 |
| Dry Reflectance | 88.94-89.36 | 88.19 | 88.69 |
| Delta Reflectance |  | −1.17 | −0.31 |
| Tint Strength | n/a | −8.19% | −4.89% |

When TiO$_2$ is removed from the formulation as in Example 7, the contrast ratio and reflectance both drop significantly versus the second standard paint of Example 6. The tint strength also drops to −8.19%. When the latex polymer additive is admixed to the letdown formulation at 85% TiO$_2$ loading as in Example 8, the contrast ratio is higher than that of Example 6. In addition, the reflectance is slightly lower. and the tint strength is reduced, but not as much as in the case when the inventive additive is not present.

While it is apparent that the illustrative embodiments of the invention disclosed herein fulfill the objectives stated above, it is appreciated that numerous modifications and other embodiments may be devised by those skilled in the art. Feature(s) or element(s) from one embodiment can be used in or with other embodiments. Therefore, it will be understood that the appended claims are intended to cover all such modifications and embodiments, which would come within the spirit and scope of the present invention.

We claim:

1. An architectural composition comprising:
    an additive comprising latex particles, wherein the latex particles comprise a polymer copolymerized with a polymerizable surfactant, wherein the polymer is non-film forming at room temperature and has a glass transition temperature greater than about 30° C.;
    opacifying pigments; and
    a film-forming polymer binder;
    wherein the polymerizable surfactant comprises a first end that bonds the additive to the film-forming polymer binder and a second end that adsorbs the additive to the opacifying pigments; and
    wherein the latex particles form an admixture with the film-forming polymer binder.

2. The architectural composition of claim 1, wherein the glass transition temperature is greater than about 50° C.

3. The architectural composition of claim 1, wherein the glass transition temperature is greater than about 100° C.

4. The architectural composition of claim 1, wherein the first end of the polymerizable surfactant comprises a mono or multi allyl.

5. The architectural composition of claim 1, wherein the second end of the polymerizable surfactant comprises a phosphate or sulfate end.

6. The architectural composition of claim 1, wherein the latex particles comprise a volume average particle size of from about 100 nm to about 200 nm.

7. The architectural composition of claim 1, wherein the latex particles comprise a volume average particle size of from about 140 nm to about 150 nm.

8. The architectural composition of claim 1, wherein a weight ratio of additive to the opacifying pigments in the architectural composition is from about 1:5 to about 1:15.

9. The architectural composition of claim 1, wherein a weight ratio of additive to the opacifying pigments in the architectural composition is from about 1:7.5 to about 1:12.5.

10. The architectural composition of claim 1, wherein the latex polymer copolymerized with the polymerizable surfactant comprises from about 5% to about 25% of a total amount of polymer in the architectural composition.

11. The architectural composition of claim 1, wherein the latex polymer copolymerized with the polymerizable surfactant comprises from about 7% to about 15% of a total amount of polymer in the architectural composition.

12. The architectural composition of claim 1, wherein the additive comprises from about 0.5% to about 7.5% by weight of the architectural composition.

13. The architectural composition of claim 1, wherein the additive comprises from about 1.0% to about 3.5% by weight of the architectural composition.

14. An additive for the architectural composition, the additive comprising:
    a plurality of latex particles, each latex particle comprising a latex polymer copolymerized with a polymerizable surfactant, the latex polymer is non-film forming at room temperature polymer and has a glass transition temperature greater than about 30° C.;
    wherein the additive is capable of forming an admixture with a binder in the architectural composition and wherein the polymerizable surfactant comprises a first end that is capable of bonding to the binder and a second end capable of adsorbing to opacifying pigments in the architectural composition.

15. The additive of claim 14, wherein the second end of the polymerizable surfactant comprises a phosphate or sulfate end and the first end of the polymerizable surfactant comprises a mono or multi allyl end.

16. The additive of claim 14, wherein the latex particles comprise a volume average particle size of from about 75 nm to about 200 nm.

* * * * *